Figure 5:
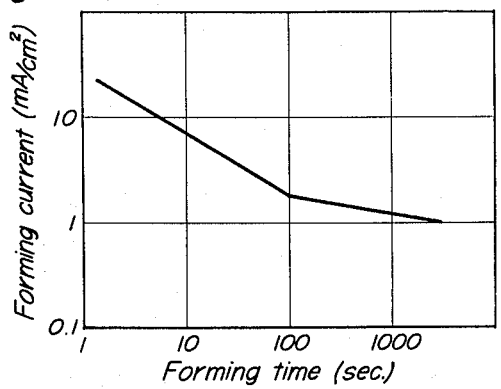

March 8, 1966  HIROSHI HAGIWARA ETAL  3,239,436
METHOD OF MAKING TITANIUM ELECTROLYTIC CAPACITORS
Filed Sept. 28, 1962                                   4 Sheets-Sheet 1
FIG. 1A
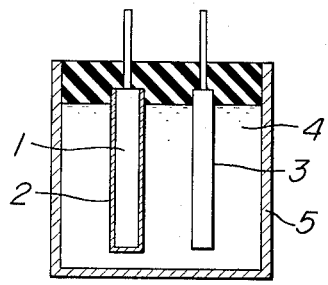
FIG. 1B
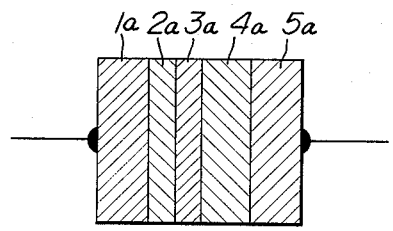
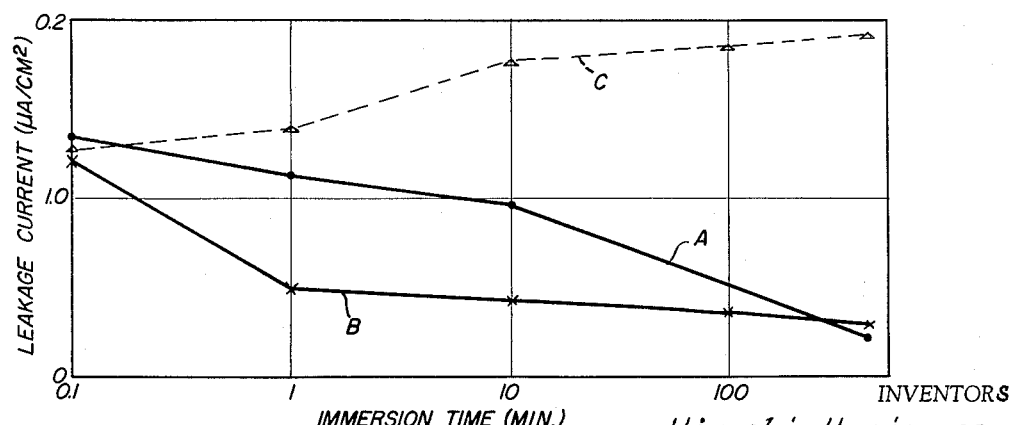
Fig. 4
INVENTORS
Hiroshi Hagiwara,
Akio Yamashita

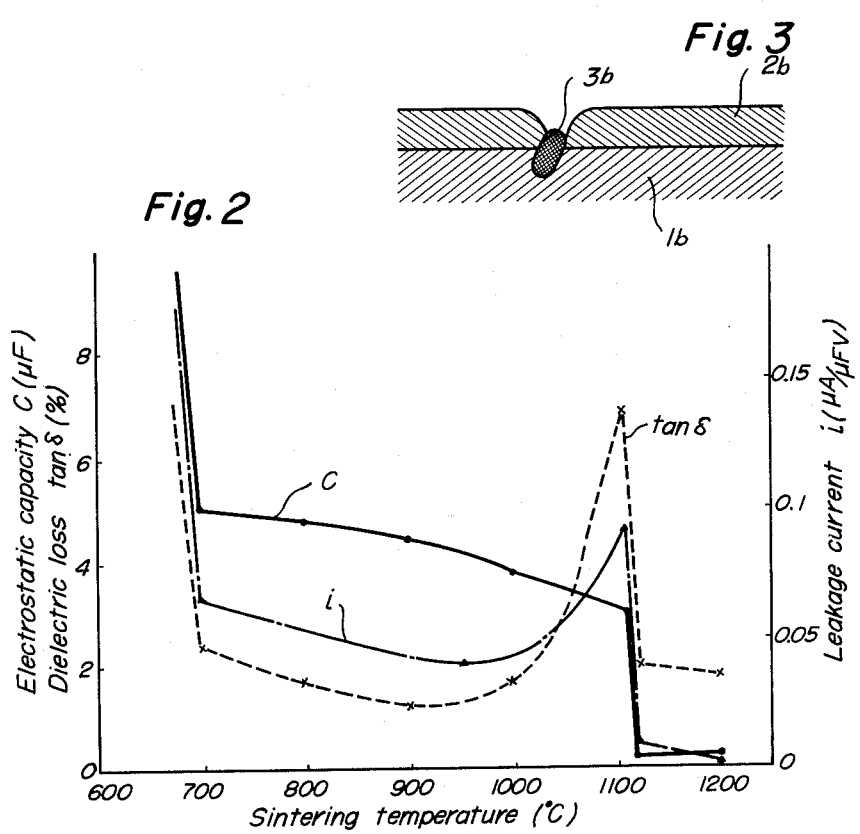

INVENTORS
Hiroshi Hagiwara
Akio Yamashita
By Stevens, Davis, Miller & Mosher
Attorneys United States Patent Office 3,239,436
Patented Mar. 8, 1966

3,239,436
METHOD OF MAKING TITANIUM ELECTRO-
LYTIC CAPACITORS
Hiroshi Hagiwara, Higashiyodogawa-ku, and Akio Yamashita, Ikeda-shi, Osaka, Japan, assignors to Matsushita Electric Industrial Co., Ltd., Kitakawachi-gun, Osaka, Japan
Filed Sept. 28, 1962, Ser. No. 226,833
7 Claims. (Cl. 204—32)

The present invention relates to a method of making titanium electrolytic capacitors. The titanium electrolytic capacitor as referred to herein is a capacitor which employs metal titanium as a base metal with a film of titanium oxide formed on the surface thereof by electrochemical means to serve as a main dielectric and a layer of conductor material and, if desired, a layer of semiconductor material both deposited on the oxide film. The semiconductor layer is usually formed of manganese dioxide, zinc oxide, germanium or lead sulfide, while the conductor layer takes the form of a vapor-deposited film of metal such as gold or aluminum or a coating of silver paste or colloidal carbon.

In general, an oxide film is formed on a titanium metal surface by anodic oxidation. The crystal structure and oxygen content of the oxide film formed depends largely upon the forming method. By selecting proper forming conditions, an oxide film may be obtained which is electrically suitable for use as a dielectric having characteristics excelling those of other dielectric metal oxides such as aluminum, tantalum and niobium oxide. That is, the titanium oxide film properly formed has a dielectric constant higher than that of aluminum, tantalum or niobium oxide and a dielectric loss tangent lower than that of any of these metal oxides, and also is very eminent in frequently characteristics. When used as a base metal in a capacitor, titanium is slightly inferior to tantalum or niobium but much superior to aluminum in corrosion resistance, weather resistance, thermal deterioration and other characteristics relating to the service life of the capacitor. The reason why the titanium electrolytic capacitor has not been completed for use so far despite such excellent characteristics of titanium is that metal titanium was not available with any satisfactorily high purity and that the techniques of forming metal oxide films had not been fully developed.

However, most recently, it has become possible to obtain metal titanium of a highly improved purity and the researches on the anodic oxidation process for the metal have well advanced increasing the possibilities of the use of the metal in capacitors. And so electrolytic capacitors have been developed recently as well as those using tantalum and aluminum. With these capacitors, an inorganic and stable semiconductor material is utilized instead of liquid electrolyte solution and this has enabled rapid improvement in characteristics of the capacitors.

Previous examples of electrolytic capacitors are few which use metal titanium having on the surface an oxide film formed by electrochemical means to be utilized as a dielectric. An object of the present invention is to provide a method of making titanium electrolytic capacitors having high dielectric constant, small dissipation factor and small leakage current.

Another object of the present invention is to provide a titanium electrolytic capacitor which has an oxide film electrochemically formed on the metal titanium and a semiconductor or conductor intimately bonded to the oxide film and has excellent characteristics over wide temperature and frequency ranges.

A further object of the present invention is to provide a capacitor of the kind described which is economical in material, comparable in characteristics to a tantalum electrolytic capacitor, satisfactory in service life and highly valuable in practical applications.

A still further object of the present invention is to provide a method of forming an improved titanium oxide film suitable for use as a dielectric of a solid-electrolyte capacitor of the kind described, and particularly to provide an improved method of pretreating titanium before it is subjected to anodic oxidation and an improved electrolytic solution and forming process to be employed in anodic oxidation of titanium.

Figure 6:
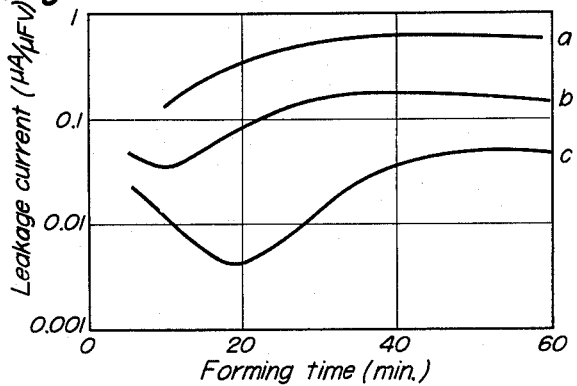
Figure 7:
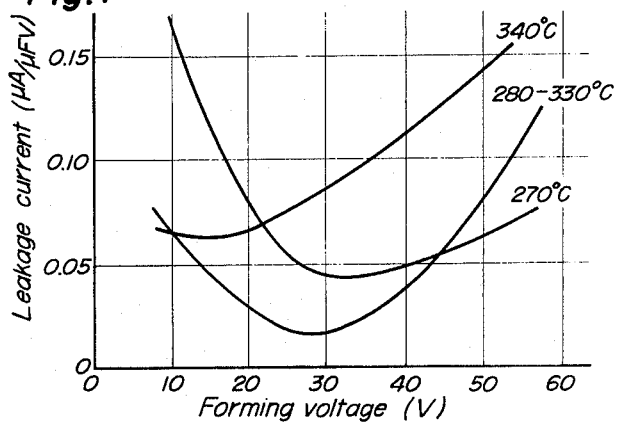
Figure 8:
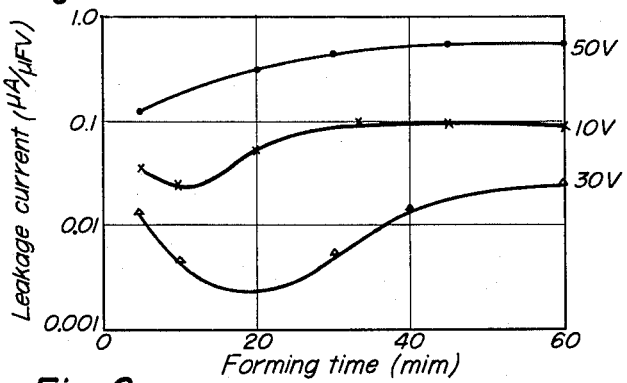
Figure 9:
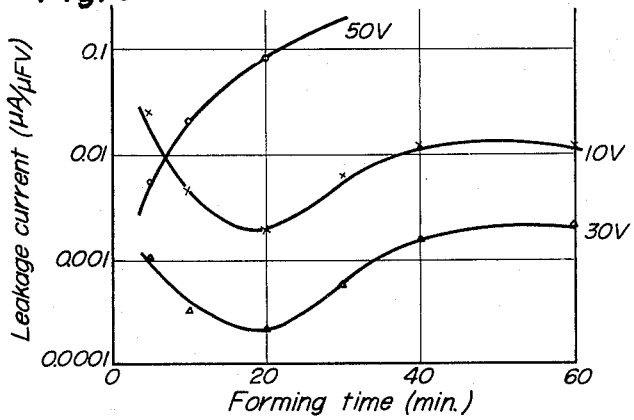
Figure 10:
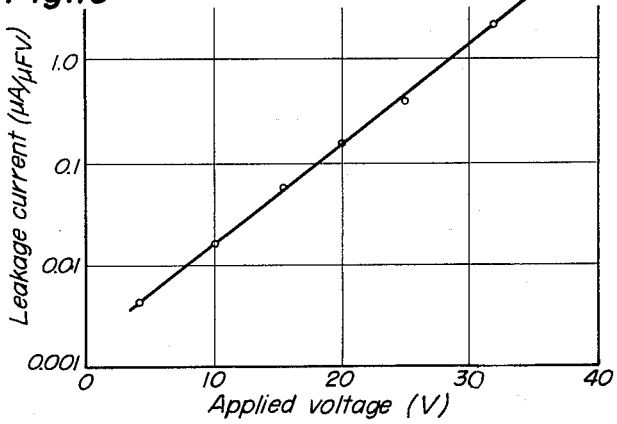

These and other objects, features and advantages of the present invention will become apparent from the following detailed description when read with reference to the accompanying drawings, in which:

FIGURE 1A shows the structure of a wet type titanium electrolytic capacitor;
FIGURE 1B shows the structure of a dry type titanium electrolytic capacitor;
FIGURE 2 shows the relationship is the electrostatic capacity, dielectric loss and leakage current to the sintering temperature at which is sintered the titanium element for the electrolytic capacitor according to the present invention;
FIGURE 3 is a cross-sectional illustration of a portion of the metal titanium showing the way in which the latter is pretreated according to the present invention;
FIGURE 4 illustrates the immersion time to leakage current relationship obtained when the pretreatment has been performed;
FIGURE 5 illustrates the forming time to forming current relationship when the metal titanium is subjected to formation in a molten salt bath;
FIGURE 6 illustrates the relationship between the forming time and the leakage current when the same forming procedure has been effected;
FIGURE 7 illustrates the relationship between the forming voltage and the leakage current when a molten salt mixture of sodium nitrate and sodium nitrite is used;
FIGURE 8 illustrates the relationship between the forming time and the leakage current corresponding to FIGURE 7.
FIGURE 9 illustrates the relationship between the forming time and the leakage current when a molten salt mixture of sodium nitrate and calcium nitrate is used; and
FIGURE 10 illustrates the relationship between the applied voltage and the leakage current under a certain condition when the same salt mixture as in FIGURE 9 is employed.

In FIGURE 1A the structure of a wet type titanium electrolytic capacitor is shown wherein reference numeral 1 indicates the titanium metal base, 2 is an anodized oxide film, 3, a metallic negative electrode, 4, an electrolytic material and 5, a casing.

FIGURE 1B shows a structure based on the principle of a dry type titanium electrolytic capacitor wherein reference numeral 1a indicates the titanium metal base, 2a, an anodized oxide film, 3a, a semi-conductor layer, 4a, a carbon layer and 5a, a silver electrode layer.

To begin with, the anodic base of titanium may take the form of a foil, wire or sintered powder. Among others, the sintered material is produced under conditions widely differing from those for tantalum and niobium. It has been found that the grain size of the titanium powder and the sintering temperature therefor are critical in order to obtain a satisfactory sintered titanium material. Detailed description will now be given in connection with these conditions.

*Grain size of titanium powder*

In connection with titanium, sintering is being employed only in powder metallurgy but has never been used in the manufacture of anodic bases for electrolytic capacitors. In addition, in powder metallurgy it is desired that the sintered product have a porosity as small as possible and only powders finer than 300 mesh are used as sintering material. However, in order that the sintered product may successfully be utilized as an anode base of electrolytic capacitors, it must have an adequate porosity, high enough to be impregnated with the electrolyte, to give an increased effective area of the electrode surface so that compact large-capacitance capacitors may be obtained. According to one aspect of the present invention, sintered products are obtained from titanium powders including 50% or less fine grains smaller in size than 300 mesh for use in electrolytic capacitors. For anode bases of electrolytic capacitors, sintered products from powders of tantalum and niobium have previously been in use. However, titanium differs widely from tantalum or niobium in physical and chemical properties; titanium has a melting point lower than that of tantalum or niobium and an affinity to oxygen, nitrogen, hydrogen and other gaseous fluids much higher than that of tantalum or niobium. Consequently, the grain size of titanium powder usable in sintering is naturally widely different from that of tantalum or niobium powder. For obtaining sintered products to be used in electrolytic capacitors, the tantalum powder employed rarely has a grain distribution including only particle sizes larger than 300 mesh, but usually contains finer or less than 300 mesh particles admixed for the purpose of obtaining compact large-capacitance units.

To cite one example, 300 mg. of tantalum powder containing 20% of particles ranging between 100 and 200 mesh, 20% of particles between 200 and 300 mesh and 60% of particles finer than 300 mesh was sintered under vacuum of $10^{-5}$ mm. Hg at a temperature of 2000° C. for 60 minutes. Samples of the sintered product were subjected to anodic oxidation in an aqueous solution of phosphoric acid and measured in a 10% aqueous solution of sulfuric acid at room temperature for electrostatic capacity C, dielectric loss tan δ and leakage current $i$, giving $C = 3$ μf. (120 c./s.)

$\tan \delta = 2.0\%$ (120 c./s.)

$i = 0.0003$ (μa./μf.·v.)

Next, experiments conducted with titanium will be described. Titanium powders of different grain sizes were compacted into shapes and sintered under vacuum of $10^{-5}$ mm. Hg at a temperature of 1000° C. for 20 minutes. The samples thus obtained were subjected to anodic oxidation in a molten nitrate bath at 400° C. and measured in a 10% aqueous solution of nitric acid at room temperature for electrostatic capacity C, dielectric loss tan δ, and leakage current $i$, giving the following results.

| Sample No. | Grain size, mesh | | | | Electrostatic capacity (120 c./s.), μf. | Loss tan δ (120 c./s.), percent | Leakage current $i$, μa./μf.v. |
|---|---|---|---|---|---|---|---|
| | 100> | 100–200 | 200–300 | 300< | | | |
| | Percent | Percent | Percent | Percent | | | |
| 1 | 100 | | | | 7.3 | 1.5 | 0.008 |
| 2 | | 100 | | | 5.1 | 1.5 | 0.009 |
| 3 | | | 100 | | 4.0 | 2.0 | 0.006 |
| 4 | | | | 100 | 0.15 | 1.5 | (¹) |
| 5 | | 75 | 25 | | 4.3 | 3.0 | 0.12 |
| 6 | | 50 | 50 | | 3.8 | 3.5 | 0.50 |
| 7 | | 25 | 75 | | 3.5 | 4.0 | 0.12 |
| 8 | | | 95 | 5 | 3.8 | 2.5 | 0.04 |
| 9 | | 35 | 35 | 30 | 2.0 | 6.0 | 1.2 |
| 10 | | 25 | 25 | 50 | 0.15 | 1.5 | (¹) |

¹ Porosity lost.

It is observed that titanium showed a tendency quite distinct from tantalum; that is, titanium powders including 50% or more of particles finer than 300 mesh gave sintered products lacking porosity. The same result was obtained even when the sintering temperature was lowered to the vicinity of 600° C.

Tantalum powder in general gives a satisfactory leakage current characteristic irrespective of the distribution of grain sizes involved. On the other hand, the samples obtained from titanium powder including particles between 100 and 200 mesh or 200 and 300 mesh exhibited extraordinarily low leakage current values, as listed above. Powders having a range of grain distribution of less than 100 mesh give further improved leakage current characteristics.

Sintering temperature

Previously, in powder metallurgy of metal titanium, sintering has been performed in vacuum as high as $10^{-5}$ mm. Hg at 1200° C. for 16 hours to obtain sintered products having a specific gravity of approximately 4.5. However, such products, when utilized as an anode base of electrolytic capacitors, cannot be fully impregnated with the electrolyte solution to produce capacitors of high capacitance. Accordingly, sintering conditions must be carefully selected to obtain sintered products having an adequate porosity so that such sintered products may successfully be employed as anode bases of electrolytic capacitors. It has been found through investigations conducted on sintering conditions to be met to give an adequate porosity to the sintered products that the sintering temperature is a very important factor, and the sintering temperature was determined to meet the requirements for obtaining sintered products practically usable in capacitors of the character. In powder metallurgy, the sintering temperature is generally set at about two-thirds of the melting point of the metal, and in case of powder metallurgy of titanium, the temperature is usually about 1,200° C. However, when the titanium powder is sintered at 1,200° C., the sintering time must be limited to five minutes or shorter to retain the porosity of the sintered product. In addition, even if the sintering time of five minutes or shorter be employed, the product will give finished capacitors an equivalent series resistance which is undesirably large as long as the particles in the sintered product are excessively welded together. Moreover, the sintering at such high temperature is apt to cause non-uniformity in the sintered product because of the temperature distribution in the material and thus is undesirable from the industrial viewpoint. In the method of the present invention, use is made of titanium powder containing particles finer than 300 mesh in proportion of 50% or less to obtain sintered products for electrolytic capacitors in a manner so that the products retain a porosity sufficient to be impregnated with the electrolyte. The sintering is effected at a temperature of from 500° C. to 1100° C.

A practical example of carrying out the method of the invention will now be described.

Titanium powder of 99.5% purity and the range of particle size of 50 to 100 mesh was molded under pressure of 0.5 t./cm.² and sintered for 60 minutes at temperatures ranging from 500° C. to 1,200° C. The product obtained was subjected to anodic oxidation in a molten nitrate bath at 400° C. for use in capacitors. The capacitors obtained were measured in a diluted aqueous solution of nitric acid at room temperature for leakage current $i$ (μa./μf.·v.), electrostatic capacity C(μf.) at 120 c./s. frequency and dielectric loss tan δ (percent), giving values as shown in FIG. 2. It is observed that the electrostatic capacity decreases gradually with rise of the sintering temperature and suddenly falls at about 1,100° C. This means that the powder is sintered gradually as the temperature rises to the vicinity of 1,100° C. when the porosity is lost no longer to allow impregnation of the electrolyte. Also, the dielectric loss increases gradually with the temperature as observed. The reason for this is that the pores are reduced in size with progress of the sintering only to receive slender column-shaped portions of the electrolyte, which increase the equivalent series resistance of the product. When the porosity is lost in the vicinity of 1,100° C., the product is reduced to a mere rod of titanium and the dielectric loss is decreased suddenly. As regards the leakage current, a sudden decrease takes place in the vicinity of 700° C. and is followed by a more or less increase toward 1,100° C. In the vicinity of 1,100° C. the leakage current decreases suddenly as the porosity is lost. The substantial leakage current at temperatures below 700° C. is due to the insufficient sintering.

In case up to 50% of a powder finer than 300 mesh is employed, the appropriate range of sintering temperature is from 500° C. to 900° C., but the tendency of the variation of electrostatic capacity, dielectric loss and leakage current with the temperature change is generally similar to that shown in FIG. 2.

*Pretreatment*

The above-described sintered titanium or titanium foil or rod is anodized in an electrolyte to form an oxide film. It has been found that such oxide film may be improved by subjecting the metal titanium to an appropriate pretreatment before the anodic oxidation.

Such pretreatment will be described below.

FIG. 3 is a cross section of metal titanium illustrating the manner in which the metal titanium is pretreated according to the present invention; and FIG. 4 illustrates immersion time-leakage current characteristics of the product subjected to the pretreatment. The leakage current in the titanium electrolytic capacitor is presumably due to the presence of impurities in the metal titanium. Major impurities in metal titanium now on the market are iron and oxygen. It is known that the presence of iron acts to increase the leakage current. The impurity oxygen takes the form of titanium oxide. The presence of such oxide on the surface of metal titanium partially covering the latter acts to make nonuniform the distribution of forming current in the metal surface when the metal titanium is subjected to anodic oxidation due to the large difference is electrical resistance between the metal titanium and the titanium oxide. As a result, a nonuniform anodic oxidation film is formed on the metal surface to increase the leakage current. Since metal titanium is easily oxidizable, it is nearly impossible to completely remove any oxide from the metal surface before anodic oxidation. It is undesirable to have a nonuniform oxide coating on the metal surface. However, a uniform distribution of oxide on the metal surface provides a forming current of uniform distribution. In other words, a desirable uniform oxide film can be obtained on the metal surface by anodic oxidation as long as the metal surface carries a thin uniform oxide film containing no impurities when the metal is subjected to anodic oxidation. It is expected that a considerably reduced leakage current is obtained as long as the metal surface has been cleared of any impurities before anodic oxidation even if the purity of the entire metal is not raised. This is because in anodic oxidation only a very thin metal layer on the surface is employed to form an oxide film. The pretreatment of the present invention is based upon these considerations and is featured by immersing metal titanium in a solution of an acid noncorrosive to metal titanium to clear the metal surface of impurities and form a thin uniform oxide film on the surface. FIG. 3 diagrammatically illustrates an oxide film 2b formed in this manner on the surface of metal titanium 16. Particularly, where impurities such as iron exist on the metal surface, the impurity portions are converted into iron oxide, which usually makes a path of leakage current because of its limited insulation. However, when the immersion time is extended, the iron is gradually dissolved away from the metal surface because of its solubility in dilute acid. As the impurity iron is thus removed, an oxide film is immediately formed at the place so that the metal surface is covered with a uniform oxide film. Thus, the leakage current is reduced as the immersion time is extended.

The same effect is also expected when the metal titanium is immersed in a concentrated acid solution. In this case, it is presumed that since the metal titanium is readily oxidizable the formation of titanium oxide film 2b (see FIG. 3) proceeds along the boundary between the impurities 3b and the metal titanium in a manner so as to gradually force the impurities outward. Also, after the oxide film 2b has been formed as shown in FIG. 3, when the object is immersed in an etching liquid such as a mixed aqueous solution of fluoric and nitric acids, the impurity portions are etched away at a higher rate than the remaining portion because of the difference in susceptibility to the etching effect so that the impurities are effectively removed away while at the same time a thin uniform oxide film is formed on the metal surface.

In view of this, the pretreatment of the invention is only required to employ an oxidizing solution to which metal titanium is corrosion resistant. Such solution may be, for example, a neutral or alkaline solution, or a solution containing an oxidizing acid, a reducing acid containing an oxidizer, an organic acid, nitric acid, chromic acid, or a solution which includes an oxidizing substance such as dissolved oxygen and metal ions such as ferric and cupric ions.

Laboratory experiments of this pretreatment process will now be described. A specimen of metal titanium subjected to the inventive pretreatment and that not subjected to such pretreatment were compared with each other by examining their metal surfaces by electron microscopic photography at a magnification of 10,000. Also, such metal surfaces formed with an oxide film by anodic oxidation in a molten nitrate bath were compared with each other by electron microscopic photography at a magnification of 10,000. The surface of metal titanium and that of the oxide film formed thereon by anodic oxidation, both subjected to the pretreatment, were cleaner and more uniform, evidencing the effects of such treatment, i.e., the removal of impurities from the metal surface and the formation of a thin uniform oxide film thereon by immersion of the titanium in a solution of an acid noncorrosive thereto. Next, to describe the leakage current characteristics obtained with reference to FIG. 4, the curve A represents the relationship between the immersion time in minutes and the leakage current in $\mu a./cm.^2$ as measured in a dilute electrolyte of nitric acid at room temperature with specimens each prepared by immersing a titanium wire of 0.5 mm. diameter and 99.7 purity in a 10% aqueous solution of acetic acid for a predetermined length of time and then subjecting the wire to anodic oxidation in a molten nitrate bath at 400° C. Curve B represents the relationship between the immersion time and the leakage current obtained with specimens prepared in the similar manner except that the titanium wire was immersed in a 10% aqueous solution of chromic acid. The relationship between the immersion time and the leakage current in case the titanium wire was immersed in 10% sulfuric acid, to which titanium is not corrosion resistant, is represented by curve C. It is observed in FIG. 4 that with specimens subjected to immersion treatment in an acid noncorrosive to titanium the leakage current decreases with the increase of the immersion time, whereas with specimens prepared by immersion in sulfuric acid or other acid which is corrosive to the metal the leakage current increases with the immersion time.

In the above, the leakage current as measured in an electrolyte was employed as a measure of determining the effect of the pretreatment because the amount of leakage current measured in this manner is directly proportional to the leakage current occuring in titanium electrolytic capacitors prepared with such base elements. It has also been found that the leakage current can be reduced by repeating several times immersion in a solution of acid noncorrosive to the metal followed by etching.

*Electrolyte*

The electrolyte to be used in the electrolytic procedure according to the present invention to form a titanium oxide film as a dielectric on the surface of metal titanium will now be described in detail. It has previously been known that an oxide film having an excellent insulating characteristic may be formed on metal titanium by anodic oxidation in a nonaqueous electrolyte and a variety of such nonaqueous electrolytes have been proposed. But these have been unsatisfactory to the purpose of forming dielectrics for titanium electrolytic capacitors.

The inventors have obtained an electrolyte fully satisfactory for use in forming dielectric oxide films for titanium electrolytic capacitors. It is a molten mixture of an alkali metal salt of the nitrate type and an alkaline earth metal salt of the nitrate type. As molten salts of the nitrate type for use in anodic oxidation of metal titanium have previously been known only nitrates, nitrites and alkali metals. Where a melt of these salts is used as an electrolyte, the oxide film formed on the surface of metal titanium has an unsatisfactory insulating characteristic resulting in a substantial leakage current. The electrolytes obtained by the inventors are free from such deficiencies. Some examples of the inventive electrolytes are:

(1) Potassium nitrate and calcium nitrate
(2) Potassium nitrate and strontium nitrate
(3) Sodium nitrate and calcium nitrate
(4) Sodium nitrite and calcium nitrate The melting point of the electrolyte depends upon the mixing ratio of the component salts. The mixture of sodium nitrate and calcium nitrate melts at 276° C. when the mixing ratio is 1 to 4; at 2,365° C. when the ratio is 29 to 21; and at 458° when the ratio is 4 to 1. The following table represents the comparisson made between capacitors produced through anodic oxidation with these salt mixtures and those obtained through anodic oxidation with conventional mixtures of alkali metal nitrate and nitrite with respect to the electrostatic capacity $C$ in $\mu f./cm.^2$, dielectric loss $\tan \delta$ in percent and leakage current $i$ in $\mu a./cm.^2$.

| | Composition of electrolyte | Mixing ratio | $C$, $\mu f./cm.^2$ | $\tan \delta$, percent | $i$, $\mu a./cm.^2$ |
|---|---|---|---|---|---|
| Inventive | KNO₃, Ca(NO₃)₂ | 1:1 | 0.51 | 2.3 | 0.018 |
| | KNO₃, Sr(NO₃)₂ | 4:1 | 0.48 | 2.0 | 0.025 |
| | NaNO₃, Ca(NO₃)₂ | 3:1 | 0.50 | 1.8 | 0.011 |
| | NaNO₃, Ca(NO₃)₂ | 1:1 | 0.62 | 2.1 | 0.020 |
| Conventional | NaNO₃, NaNO | 1:1 | 0.57 | 8.3 | 1.00 |
| | NaNO₃, KNO₃ | 3:1 | 0.50 | 10 | 8.00 |

Measurements were carried out in a dilute aqueous solution of nitric acid at room temperature. The electrostatic capacity $C$ and dielectric loss $\tan \delta$ were measured at a frequency of 1 kc., and the leakage current was measured one minute after a direct-current voltage of 10 v. had been applied.

As is observed, the electrolytes obtained by the inventors give a dielectric loss $\tan \delta$ and a leakage current $i$ both of a value materially reduced compared with those of conventional electrolytes and fully satisfactory for capacitors.

*Forming procedure*

An entirely novel conception has been introduced by the inventors in anodic oxidation of metal titanium in a molten salt according to the invention. Thus, in the manufacture of titanium electrolytic capacitors forming conditions have been found which give a very limited leakage current. It has been found that in anodic oxidation of metal titanium in a molten salt electrolyte there exists a certain length of forming time after application of a predetermined forming voltage which gives a minimum leakage current value per unit capacitance and per unit voltage. According to the invention the forming is characteristically complete in such length of time. On this occasion, the process of applying the predetermined forming voltage is not critical; that is, the predetermined voltage may be applied at the very start of the formation or a lower voltage may first be applied and then slowly raised to reach the predetermined value.

The formation of aluminum and tantalum is generally effected at low temperatures in the vicinity of room temperature in an aqueous or nonaqueous electrolyte. On this occasion, the forming process is continued until the forming current has been fully diminished to give a limited leakage current. It is also known in the art to effect formation of metal titanium in a molten salt of alkali metal and it is generally presumed that a longer forming time gives a smaller forming current and hence a smaller leakage current. However, in case of metal titanium, the leakage current is largely affected by the forming time. As shown by experiments, a shorter forming time gives a smaller leakage current than when a forming time is used which is long enough to substantially diminish the forming current. This indicates desirability of terminating the forming procedure at an early stage compared with the conventional procedure in which the forming is continued after the forming voltage has reached a predetermined level until the forming current is fully diminished.

Considerations will now be given with reference to experiments conducted on the forming conditions for metal titanium. The relationship between the forming time in seconds and the forming current in $ma./cm.^2$ obtained when metal titanium was formed in a molten salt at a predetermined forming voltage is graphically shown in FIG. 5. A point of flection occurred in the vicinity of 100 seconds in FIG. 5, though its position depends upon the forming voltage and the bath temperature. The flection presumably represents a change in structure of the oxide film. After the flection, the oxide film continues to grow and the forming current decreases gradually. FIG. 6 graphically illustrates the relationship between the forming time and the leakage current per unit voltage per unit capacitance in $\mu a./\mu f. \cdot v.$ as measured at room temperature. In FIG. 6, curve A corresponds to cases where a higher forming temperature or voltage is used; curve B corresponds to cases where a lower forming temperature or voltage is employed; and curve C corresponds to intermediate cases. It is observed that in some cases the leakage current increases despite a decrease of the forming current as shown in FIG. 5, the leakage current being increased even if an extended forming time is employed to substantially reduce the forming current. Though this cannot be fully explained yet, it is probable that the corrosive effect of the molten salt as an electrolyte upon the oxide film is influential here. The next problem is how to obtain optimum forming conditions, which minimize the leakage current, and such problem must be solved experimentally at the present stage where the situations have not yet been elucidated. In other words, optimum conditions to give a minimized leakage current must be found upon the basis of the relationship between the leakage current, forming time, forming temperature and forming voltage, obtained with any particular composition of molten salt, as illustrated in FIG. 6. Such forming conditions are applicable not only to electrolytes according to the present invention but also to conventional molten salts including alkali metal salts such as nitrates, nitrites and mixtures of such salts. For example, FIG. 7 illustrates the relationship between the forming voltage in volts and the leakage current in $\mu a./\mu f. \cdot v.$ for a molten mixture of sodium nitrate and sodium nitrite in the ratio of 1 to 1, as obtained for a predetermined forming time, the forming temperature being varied as a parameter. The relationship between the leakage current and the forming time in minutes for a predetermined forming temperature and for different values of the forming voltage as a parameter is shown in FIG. 8. Forming conditions to be satisfied to give a minimized leakage current can be obtained from these figures. A similar tendency can be observed with a molten mixture of sodium nitrate and calcium nitrate in the ratio of 1 to 1, which is an example of the electrolyte according to the invention. Illustrated in FIG. 9 is the relationship between the leakage current in $\mu a./\mu f.\cdot v.$ and the forming time in minutes obtained for a predetermined forming temperature and different values of the forming voltage in volts as a parameter. An example of the optimum forming conditions includes a forming temperature of 320° C., a forming voltage of 20 volts and a forming time of 20 minutes and gave an applied voltage-leakage current characteristic as shown in FIG. 10. At a frequency of 1 kc./s., the capacitance was 0.88 $\mu f.$ and the dielectric loss 2.2%. The leakage current values obtained are in the range of from only $\frac{1}{100}$ to $\frac{1}{1000}$ of those obtained with titanium electrolytic capacitors previously proposed and comparable to those of tantalum capacitors. The minimum leakage current value of specimens prepared employing conventional molten salt electrolytes is about 100 times as large as the minimum leakage current value obtained with specimens prepared according to the invention.

It will be appreciated that, as long as the above-described various conditions are satisfied, a highly improved uniform dielectric oxide film for a titanium electrolytic capacitor can be obtained in the form of a titanium oxide film, and that such oxide film is thermally stable and has a very high dielectric constant.

What is claimed is:

1. A method of making titanium electrolytic capacitors comprising providing a base of titanium metal, subjecting said base to a pretreatment by immersing the same into an acid to which the titanium metal is corrosion resistant for a time sufficient to remove any impurities from the surface of said base and to form a thin, uniform, oxide film thereon, and anodizing the pretreated base in a molten electrolyte consisting essentially of a mixture of the nitrates of an alkali metal and an alkaline earth metal.

2. A method of making titanium electrolytic capacitors according to claim 1 wherein said base is in the form of a titanium metal article selected from the group consisting of a foil, a wire, a rod and a sintered powdered body.

3. A method of making titanium electrolytic capacitors according to claim 1 wherein said base is in the form of a sintered powdered body of titanium metal, said body consisting of sintered titanium powder containing a maximum of 50 per cent of particles finer than 300 mesh.

4. A method of making titanium electrolytic capacitors according to claim 1 wherein said base is in the form of a sintered powdered body of titanium metal, said body being sintered at a temperature in the range of from 500° to 1100° C.

5. A method of making titanium electrolytic capacitors according to claim 3 wherein said body is sintered at a temperature in the range of from 500° to 1100° C.

6. A method of making titanium electrolytic capacitors according to claim 1 wherein said acid is a nitric acid.

7. A method of making titanium electrolytic capacitors according to claim 1 wherein said electrolyte is a mixture of potassium nitrate and calcium nitrate.

References Cited by the Examiner
UNITED STATES PATENTS

| | | | |
|---|---|---|---|
| 1,773,665 | 8/1930 | Edelman | 317—230 |
| 2,299,228 | 10/1942 | Gray et al. | 317—230 |
| 2,504,178 | 4/1950 | Burnham et al. | 317—230 |
| 3,054,029 | 9/1962 | Wagner | 317—230 |
| 3,093,883 | 6/1963 | Haring et al. | 317—230 |

JOHN H. MACK, *Primary Examiner.*

JAMES D. KALLAM, *Examiner.*

G. KAPLAN, *Assistant Examiner.*